United States Patent [19]
O'Toole

[11] Patent Number: 6,044,137
[45] Date of Patent: *Mar. 28, 2000

[54] AIN BASED INTERNET FAX ROUTING

[75] Inventor: Kevin R. O'Toole, Westminster, Colo.

[73] Assignees: U S West, Inc., Denver, Colo.; MediaOne Group, Inc., Englewood, Colo.

[*] Notice: This patent is subject to a terminal disclaimer.

[21] Appl. No.: 09/343,878

[22] Filed: Jun. 30, 1999

Related U.S. Application Data

[63] Continuation of application No. 08/949,830, Oct. 14, 1997, Pat. No. 5,949,859.

[51] Int. Cl.$^7$ .................................................. H04M 11/00
[52] U.S. Cl. ............................. 379/100.14; 379/100.09; 379/130; 358/407; 358/440; 370/352
[58] Field of Search ........... 379/100.01, 100.03–100.06, 379/100.08, 100.09, 100.12, 100.14, 100.15, 100.17, 93.05–93.07, 130; 358/400, 402, 407, 434–441, 468; 370/352, 389

[56] References Cited

U.S. PATENT DOCUMENTS

| 5,862,202 | 1/1999 | Bashoura et al. . |
| 5,949,859 | 9/1999 | O'Toole ............................ 379/100.14 |
| 6,608,786 | 3/1997 | Gordon . |

*Primary Examiner*—Wing F. Chan
*Attorney, Agent, or Firm*—Brooks & Kushman, P.C.

[57] ABSTRACT

A method of automatically routing a facsimile transmission from a calling party to a called party over the Internet. A facsimile transmission is detected from calling party's CPE device. A destination number for the called party's CPE device and a corresponding remote Internet gateway are determined. The facsimile transmission is routed to a local Internet gateway wherein it is converted to a form compatible with the protocol used by the Internet. It is then routed over the Internet to the remote gateway wherein it is converted to a form compatible with the protocol used by the telephone network. The facsimile transmission is then routed to the called party's CPE device.

8 Claims, 1 Drawing Sheet

AIN BASED INTERNET FAX ROUTING

This is a continuation of application Ser. No. 08/949,830 filed on Oct. 14, 1997, now U.S. Pat. No. 5,949,859.

TECHNICAL FIELD

This invention relates to a method and system for routing a facsimile transmission from a calling party to a called party over the Internet.

BACKGROUND ART

The rapid growth of the information highway and, in particular, the Internet has transformed the way business is conducted worldwide. Indeed, the Internet, with its global network of individual computers and computer networks, all communicating with one another, continues to open new paths of communication between and among businesses. As an example, whereas E-mail was once limited to large user groups typically within a single corporation, it is now relied upon by most companies as a means to communicate both internally and externally.

In addition to E-mail transmissions, the Internet has been found to be a desirable network for routing facsimile transmissions. Presently, a calling party who wishes to send a facsimile over the Internet must first dial into a suitable Internet FAX gateway. This presents obvious usability and marketing problems because users must change their behavior. Specifically, they must have both knowledge of an appropriate gateway, as well as the tools to make the appropriate connection.

Consequently, a need exists for a method and system for detecting and automatically routing a facsimile transmission from a calling party to a called party over the Internet. Such a method and system should perform this operation in a manner which is transparent to the user and should be capable of being implemented using the public network switching and signaling.

DISCLOSURE OF THE INVENTION

It is a principal object of the present invention to provide a method and system for automatically detecting and routing a facsimile transmission from a calling party to a called party over the Internet.

It is a further object of the present invention to provide such a method and system which is specifically directed for use in a telephone network.

It is yet a further object of the present invention to provide such a method and system which performs the aforementioned functions in a manner which is transparent to the user.

In carrying out the above objects, there is provided a method of automatically routing a facsimile transmission from a calling party to a called party over the Internet. The method is specifically directed for use in a telephone network, such as, for example, an Intelligent Network (IN) or an Advanced Intelligent Network (AIN), having at least one switching center serving at least one calling party.

According to the invention, at least one Internet gateway is preferably provided in communication with the telephone network. An adjunct processor, such as, for example, an AIN Service Control Point (SCP), is further provided in communication with the switching center and the at least one Internet gateway. Still further, there is provided at least one database in communication with the adjunct processor. At least one database includes a list of calling party telephone numbers associated with Customer Premises Equipment (CPE) devices that perform facsimile transmissions. The CPE device may comprise, for example, a facsimile machine, a FAX modem, or any other input device having FAX transmission capability and functionality.

In operation, a facsimile transmission from a calling party's CPE device to a called party's CPE device is first detected. The facsimile transmission is detected by comparing the calling party's telephone number with the above-mentioned database. In the preferred embodiment, the calling party's telephone number is sent along with the facsimile transmission through Automatic Number Identification (ANI) functionality.

Following detection of a facsimile transmission, it is thereafter determined at the adjunct processor what the destination number is for the called party's CPE device. The facsimile transmission is thereafter transmitted to a local Internet gateway which accepts the entire facsimile transmission and stores the transmission electronically.

The adjunct processor which, as indicated above, is preferably, but not necessarily, an AIN SCP, is operative to transit the determined destination number for the called party's CPE device to the local Internet gateway. The local Internet gateway thereafter determines a remote Internet gateway which is local to the called party's CPE device. The facsimile transmission is converted to a form compatible with the protocol used by the Internet and then routed over the Internet to the remote Internet gateway along with the determined CPE destination number. Upon receipt of the facsimile transmission and the determined CPE destination number by the remote Internet gateway, the facsimile transmission is again converted to a form compatible with the protocol used by the telephone network and then routed to the called party's CPE device.

In keeping with the invention, there is also provided a system for automatically routing a facsimile transmission from a calling party to a called party over the Internet. Like the above-described method, the system is also specifically directed for use in a telephone network having at least one switching center serving at least one calling party. The system includes at least one Internet gateway in communication with the telephone network, as well as at least one database which includes a list of calling party telephone numbers associated with CPE devices having facsimile transmission functionality. Finally, the system includes an adjunct processor in communication with the switching center, the at least one Internet gateway, and the at least one database.

The adjunct processor is typically, but not necessarily, an AIN SCP and is operative to detect a facsimile transmission from a calling party's CPE device to a called party's CPE device, determine the destination number for the called party's CPE device, instruct the switching center to route the facsimile transmission to a local Internet gateway, and transmit to the local Internet gateway the determined destination number for the called party's CPE device.

The above objects, features, and advantages of the present invention are readily apparent from the following detailed description of the best modes for carrying out the invention when taken in connection with the accompanying drawings, wherein like reference numerals correspond to like components.

BEST MODES FOR CARRYING OUT THE INVENTION

System Architecture

Figure 1:
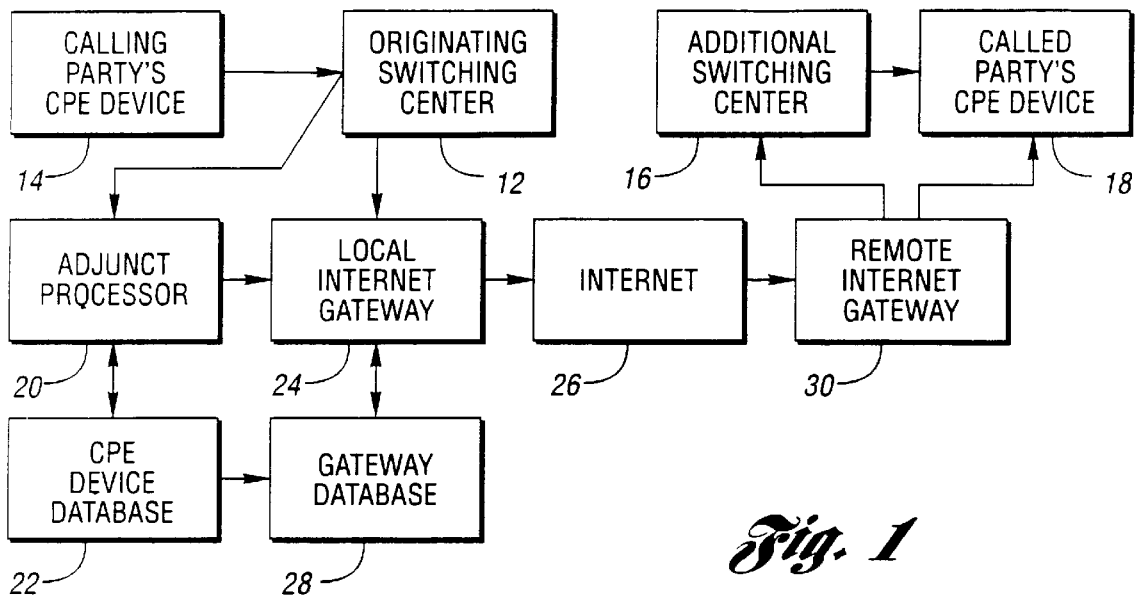
FIG. 1 is a schematic diagram of an exemplary system of the present invention.

Turning now to FIG. 1 of the drawings, there is shown a preferred embodiment of a system 10 for carrying out the method of the present invention. System 10 includes a telephone network having at least one switching center 12 which is provided in communication with a calling party's Customer Premises Equipment (CPE) device 14. Originating switching center 12 may be provided in direct communication with a called party's CPE device 18 or via an additional switching center 16, such as, for example, an answering point terminating end office which serves the called party's CPE device 18. Switching centers 12 and 16 may be provided in communication with one another via the Public Switched Telephone Network (PSTN) or any other suitable interface.

In keeping with the invention, CPE devices 14 and 18 may be conventional facsimile machines or any other device having facsimile transmission and reception capability, such as, for example, a computer equipped with a FAX modem. As noted above, switching centers 12 and 16 may be part of the PSTN.

Still referring to FIG. 1, originating switching center 12 is provided in communication with an adjunct processor 20, such as, for example, an AIN Service Control Point (SCP). In such a case, it is contemplated that the adjunct processor 20 will be provided in communication with originating switching center 12 via signaling system No. 7 protocol or a similar massaging protocol and system. As those skilled in the art will recognize, an SCP is a node which contains the required service logic and associated data support necessary to execute required customer services. This functionality, as well as the basic architecture of IN and AIN, is well known to those skilled in the art and need not be discussed in further detail herein.

Adjunct processor 20 is further provided in communication with a routing and mapping database 22 or other suitable look-up table. In accordance with the invention, database 22 is operative to store a list of calling party telephone numbers associated with calling party CPE devices such as CPE 14. A local Internet gateway 24 is further provided in communication with both adjunct processor 20 and originating switching center 12. Gateway 24 is understood by those skilled in the art to be a device used to connect dissimilar networks. That is, it is operative to connect networks using different communication protocols such that information can be passed from one to the other. Unlike a bridge, which transfers information between similar networks, a gateway both transfers information and converts it to a form compatible with the protocols used by the second network for transport and delivery.

As will be explained in further detail herein, local Internet gateway 24 is thus operative to convert facsimile transmissions from a form compatible with the protocol used by the telephone network to a form compatible with the protocol used by the Internet. At present, the Internet, which is designated generally by reference numeral 26, is operative on what is known as the Transmission Control Protocol/Internet Protocol (TCP/IP). Again, this protocol and the generalized operation of an Internet gateway are well known to those skilled in the art and need not be discussed in further detail herein. Local Internet gateway 24 differs only from a conventional gateway in that it is further equipped with or provided in communication with an additional database or look-up table 28 comprising a list of called party CPE device directory numbers and corresponding remote Internet gateways, such as, for example, gateway 30.

The above-described architecture is operative to carry out the automatic identification and routing of a facsimile transmission from a calling party's CPE device, such as device 14, to a called party's CPE device, such as device 18. In operation, a user of CPE device 14 initiates a facsimile transmission which is received by originating switching center 12. Adjunct processor 20 via reference to CPE device database 22 identifies the calling party telephone number to be associated with a CPE device 14 having facsimile transmission functionality, captures the destination number of the called party's CPE device, and directs originating switching center 12 to reroute the facsimile transmission to local Internet gateway 24. Although not shown, it is contemplated that the calling number of calling party CPE device 14 will be forwarded to local Internet gateway 24 along with the facsimile transmission as part of conventional Automatic Number Identification (ANI) functionality or other suitable means.

Following identification of the facsimile transmission, originating switching center 12 connects the facsimile call to local Internet gateway 24 where it is stored electronically. Thereafter, adjunct processor 20 transmits the destination number of the called party's CPE device to local Internet gateway 24. Gateway 24 uses the destination phone number in conjunction with gateway database 28 to identify a remote Internet gateway 30 which is local to the called party's CPE device 18. The facsimile transmission is thereafter sent across the Internet 26 from the local Internet gateway 24 to the identified remote Internet gateway 30 along with the destination number of the called party's CPE device. The remote Internet gateway 30 places a local call and delivers the facsimile transmission to the called party's CPE device 18.

As part of the above-described method, it is understood that local Internet gateway 24 is operative to convert the facsimile transmission to a form compatible with the protocol used by the Internet. As indicated above, this protocol is currently known as transmission control protocol/Internet protocol TCP/IP. The facsimile will then be converted into data and sent over the TCP/IP. Remote Internet gateway 30 is similarly operative to convert the facsimile transmission from a format compatible with the protocol used by the Internet to a format compatible with the protocol used by the telephone network, namely Fax Group 4 or a similar standard.

Figure 2:
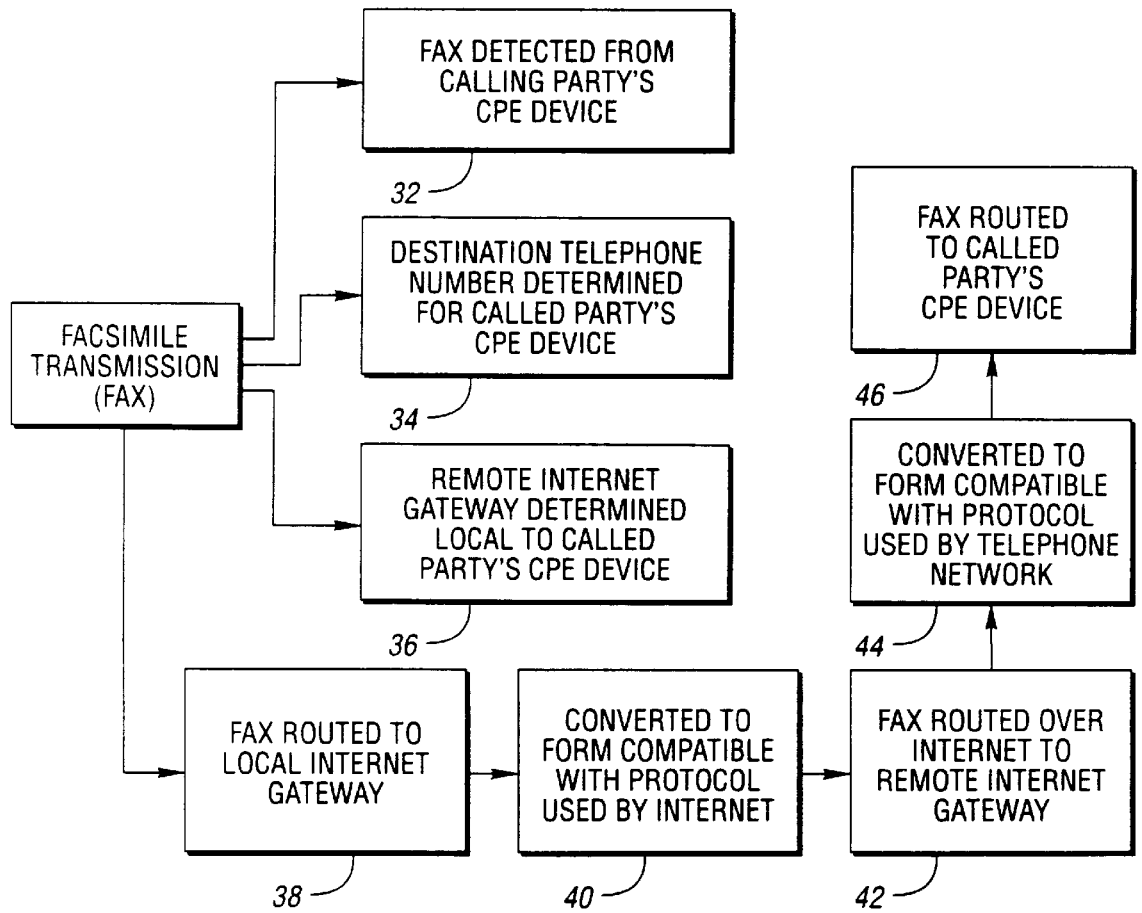
FIG. 2 is a block diagram of the method steps of the present invention.

The above-described system achieves the objectives of automatically identifying and routing facsimile transmissions in a manner which is transparent to the user and obviates the need for the user to dial into an Internet FAX gateway as a separate step. The above-described method steps may also be better understood by reference to the block diagram of FIG. 2.

As shown, the method includes detecting 32 a facsimile transmission from a calling party's CPE device to a called party's CPE device. Thereafter, a destination telephone number is determined 34 for the called party's CPE device. A remote Internet gateway is also determined 36 for the Internet which is local to the called party's CPE device. Still further, the facsimile transmission is routed 38 to a local Internet gateway whereupon it is converted 40 to a form compatible with the protocol used by the Internet. The facsimile transmission is thereafter routed 42 over the Internet to the remote Internet gateway whereupon it is again converted 44 to a form compatible with the protocol used by the telephone network. Finally, the facsimile transmission is routed 46 to the called party's CPE device.

While the best modes for carrying out the invention have been described in detail, those familiar with the art to which this invention relates will recognize various alternative designs and embodiments for practicing the invention as defined by the following claims.

What is claimed is:

1. For use in a telephone network having and at least one switching center serving at least one calling party, a method of automatically routing a facsimile transmission from a calling party to a called party over the Internet, comprising:

detecting, at an adjunct processor, a facsimile transmission from a calling party's CPE device to a called party's CPE device by comparing the calling party's telephone number with a CPE device database;

determining a destination number for the called party's CPE device using an adjunct processor;

determining a remote Internet gateway which is local to the called party's CPE device using an adjunct processor in communication with a gateway database;

routing the facsimile transmission to a local Internet gateway;

converting the facsimile transmission to a form compatible with the protocol used by the Internet;

routing the facsimile transmission over the Internet from the local Internet gateway to the remote Internet gateway;

converting, at the remote Internet gateway, the facsimile transmission to a form compatible with the protocol used by the telephone network; and routing the facsimile transmission to the called party's CPE device using the remote Internet gateway.

2. For use in a telephone network having at least one switching center serving at least one calling party, a method of automatically routing a facsimile transmission from a calling party to a called party over the Internet, comprising:

detecting a facsimile transmission from a calling party's CPE device to a called party's CPE device using a switching center in communication with an adjunct processor;

determining a destination number for the called party's CPE device using the adjunct processor in communication with a CPE device database;

determining a remote Internet gateway which is local to the called party's CPE device using the adjunct processor in communication with a gateway database;

routing the facsimile transmission to a local Internet gateway using the adjunct processor;

converting the facsimile transmission to a form compatible with the protocol used by the Internet;

routing the facsimile transmission over the Internet from the local Internet gateway to the remote Internet gateway;

converting the facsimile transmission to a form compatible with the protocol used by the telephone network; and routing, at the remote Internet gateway, the facsimile transmission to the called party's CPE device.

3. The method of claim 2 wherein the adjunct processor used in detecting the facsimile transmission is an Advanced Intelligent Network Service Control Point.

4. The method of claim 2 wherein the facsimile transmission further includes the calling party's telephone number.

5. The method of claim 2 wherein the switching center directs the facsimile transmission to the adjunct processor for comparing the calling party's number with a CPE device database.

6. For use in a telephone network having at least one switching center serving at least one calling party, a system for automatically routing a facsimile transmission from a calling party to a called party over the Internet, comprising:

at least one Internet gateway in communication with the telephone network, the Internet gateway in communication with a database of the called party CPE devices and the Internet gateway operative to convert facsimile transmissions between a form compatible with the protocol used by the telephone network and a form compatible with the protocol used by the Internet;

at least one database including a list of calling party telephone numbers associated with CPE devices having facsimile transmission functionality; and an adjunct processor in communication with the switching center and the at least one Internet gateway, wherein the adjunct processor is operative to detect a facsimile transmission from a calling party's CPE device to a called party's CPE device, determine a destination number for the called party's CPE device, instruct the switching center to route the facsimile transmission to a local Internet gateway, and transmit to the local Internet gateway the determined destination number for the called party's CPE device.

7. The method of claim 1 wherein the facsimile transmission further includes the calling party's telephone number.

8. The method of claim 1 wherein the adjunct processor used in detecting the facsimile transmission is an Advanced Intelligent Network Service Control Point.

* * * * *